United States Patent [19]
Wenger

[11] Patent Number: 4,738,417
[45] Date of Patent: Apr. 19, 1988

[54] HAND OPERATED CONTROL

[75] Inventor: William K. Wenger, Sunol, Calif.

[73] Assignee: FMC Corporation, Chicago, Ill.

[21] Appl. No.: 10,099

[22] Filed: Feb. 2, 1987

[51] Int. Cl.$^4$ .............................................. B64C 13/04
[52] U.S. Cl. ................................. 244/234; 74/471 XY
[58] Field of Search .............. 244/234, 236, 237, 223; 74/471 XY; 180/333, 319

[56] References Cited

U.S. PATENT DOCUMENTS

| | | | |
|---|---|---|---|
| 2,841,659 | 7/1958 | Eitel | 74/471 XY |
| 3,350,956 | 11/1967 | Monge | 244/234 |
| 3,693,148 | 2/1972 | Brown et al. | 74/471 XY |
| 3,818,154 | 6/1974 | Presentey | 74/471 XY |
| 4,127,841 | 11/1978 | Kato et al. | 74/471 XY |
| 4,332,177 | 6/1982 | Andresen | 74/471 XY |
| 4,580,006 | 4/1986 | Hull | 74/471 XY |
| 4,656,461 | 4/1987 | Morsch et al. | 74/471 XY |

FOREIGN PATENT DOCUMENTS 1211314  2/1966  Fed. Rep. of Germany ...... 244/236

Primary Examiner—Joseph F. Peters, Jr.
Assistant Examiner—L. M. Fiorito
Attorney, Agent, or Firm—A. J. Moore; H. M. Stanley; R. B. Megley

[57] ABSTRACT

A hand operated control for a rough riding vehicle is disclosed and includes a truncated sphere having a soft hand grip movably mounted thereon. A position sensing mechanism is partially encompassed within said truncated sphere and is connected to the soft hand grip and a computer for sending control signals to the vehicle. The soft hand grip is held from movement by firmly gripping the hand grip to the truncated sphere, and is controllably moved relative to the truncated sphere about a center within the grip of the hand to transmit control signals to the vehicle such as direction of movement signals when the grip on the hand grip is relaxed.

15 Claims, 3 Drawing Sheets

FIG_1
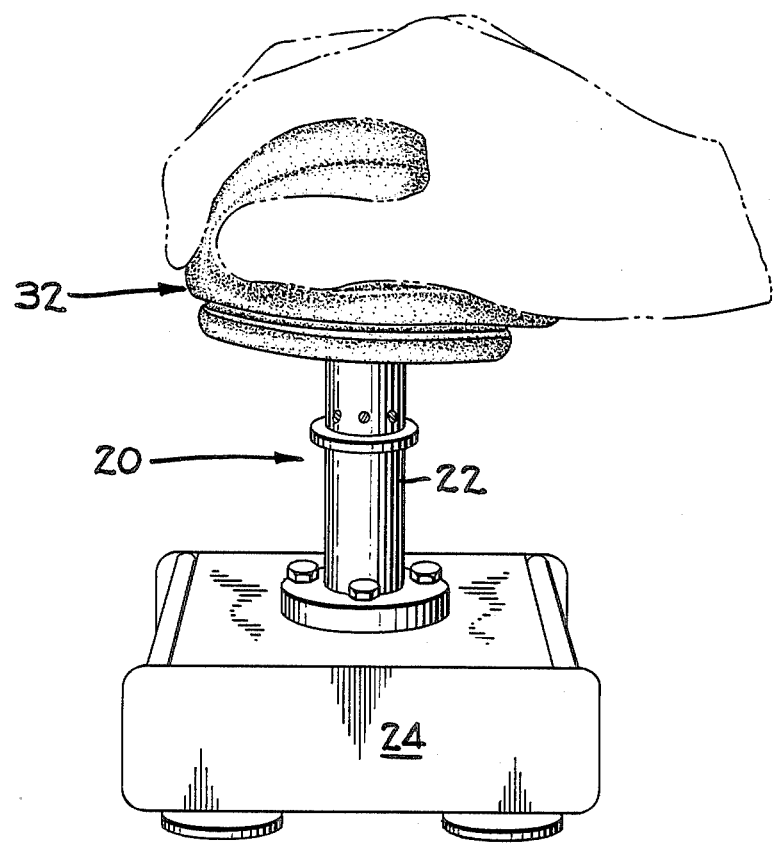
FIG_2
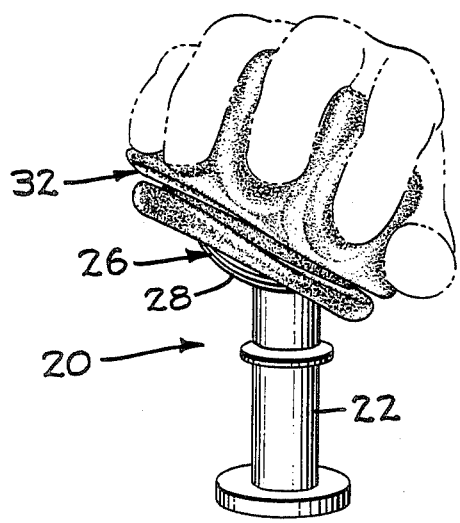
FIG_3
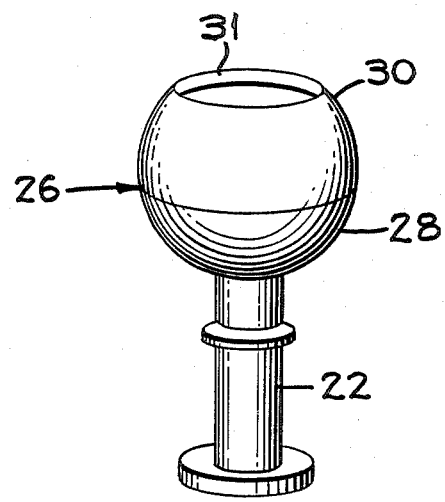

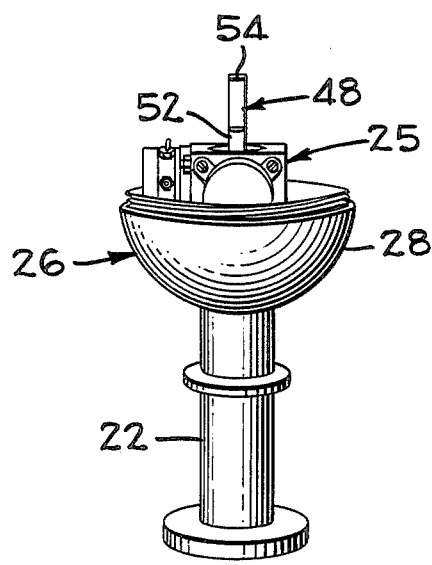
FIG_4
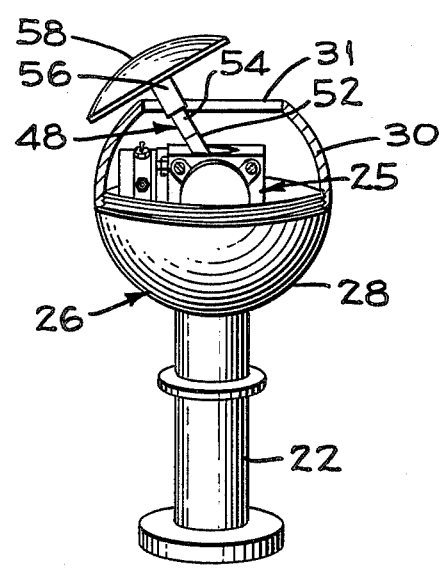
FIG_5
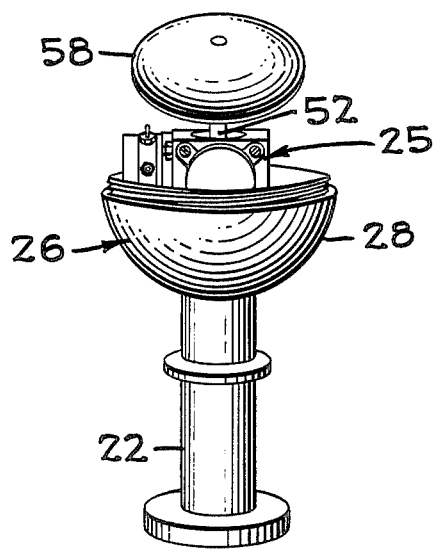
FIG_6
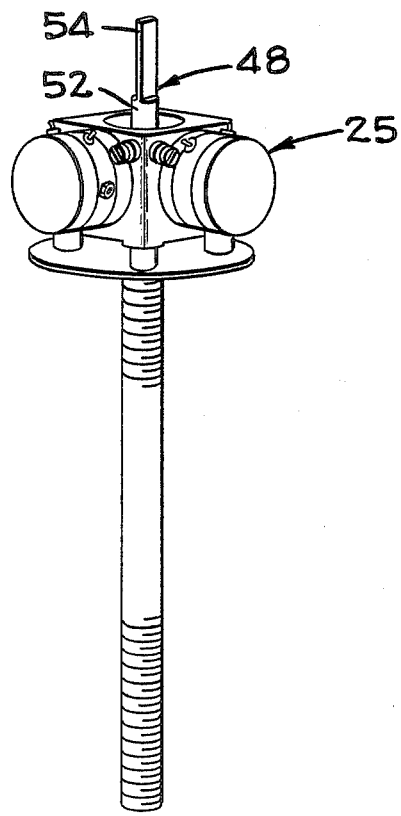
FIG_7

FIG_8
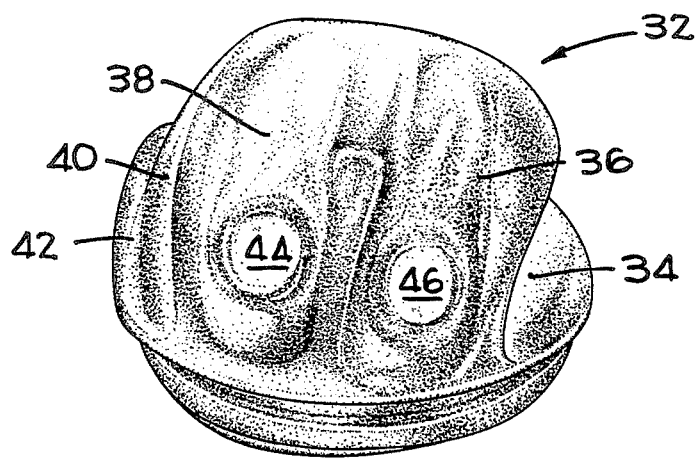
FIG_9
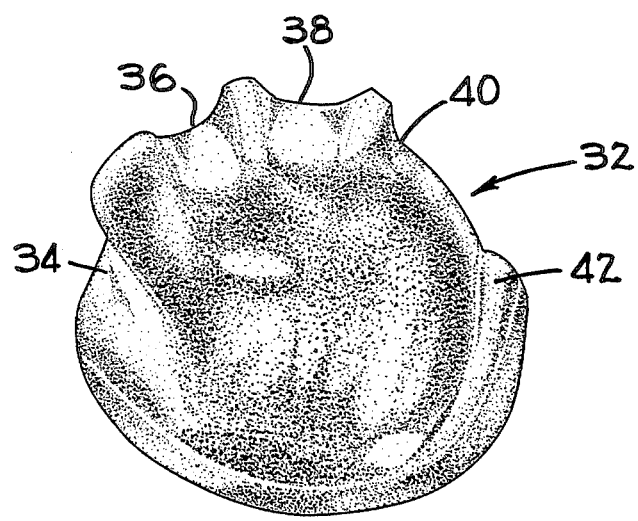

HAND OPERATED CONTROL

BACKGROUND OF THE INVENTION

1. Field of the Invention

The present invention pertains to hand operated controls and more particularly relates to hand operated controls used on rough riding vehicles such as ground supported vehicles, military aircraft and boats or the like for preventing inadvertent movement of the operator from being transmitted to the control system of the vehicle.

2. Description of the Prior Art

Heretofore fast combat vehicles driven over rough terrain, aircraft flown through turbulent air, and ships on rough water have been controlled by hand held joy sticks, yokes or wheels movably connected to the vehicle at a point remote from the operator's hand. When an operator in a rough riding vehicle maintains control of the vehicle with such prior art hand held controls, the inadvertent movement of the operator's hand caused by the rough ride is transmitted to the controls causing unnecessary and/or detrimental control input to be made to the vehicle. For example, unintentional changes of direction of the moving vehicle due to rough conditions when firing guns may result in missing the intended target.

SUMMARY OF THE INVENTION

The hand operated control of the present invention is primarily intended for use with fast combat vehicles which are driven over rough terrain. The hand control includes a pedestal and a truncated sphere rigidly secured to the vehicle. A position sensing mechanism is at least partially mounted within the truncated sphere with a movable portion thereof projecting out of the sphere. A molded hand grip of relatively soft material is attached to a portion of the position sensing mechanism and is movably fitted over a major portion of the truncated sphere. When subjected to a rough ride, the operator firmly squeezes the hand grip thus clamping the grip to the sphere thereby preventing movement of the grip around the sphere and also helping to stabilize the hand and body of the operator. When the hand pressure on the grip is momentarily relaxed, the hand grip can easily be moved to allow control input to be made by the position sensing mechanism of the vehicle. Furthermore, because the control movement is centered within the grip of the hand, the radial movement of control is different than the forces typically encountered as a result of the ride. The forces resulting from a rough ride due to inadvertent body and hand movement of the operator tend to be rectilinear movements such as up-/down, fore/aft and side to side movements with all combinations in between. These rectilinear movements or forces are not likely to inadvertently move the hand grip radially even when the hand grip is not firmly grasped because the radial control movement is centered within the grip of the hand.

BRIEF DESCRIPTION OF THE DRAWINGS

FIG. 1 is a side perspective of the hand operated control of the present invention illustrating the hand of an operator in the centered, neutral position on the soft hand grip.

FIG. 2 is a front perspective similar to FIG. 1 but at a small scale and with the hand grip at a different angle indicating a control input.

FIG. 3 is a perspective showing only the truncated sphere and a pedestal with the hand grip removed.

FIG. 4 is a perspective of the pedestal and the lower portion of a truncated sphere with a portion of an electro-mechanical position sensing mechanism therein shown in a centered, neutral position.

FIG. 5 is a perspective similar to FIG. 4 but illustrating the upper truncated portion of the sphere in central section with a stem and grip attachment head of the sensing mechanism shown at a first angle relative to its neutral position.

FIG. 6 is a perspective similar to FIG. 5 but with the truncated portion of the sphere removed and the movable stem and head of the movable portion of the position sensing mechanism tilted in another direction.

FIG. 7 is a perspective of the electro-mechanical position sensing mechanism removed from the pedestal.

FIG. 8 is a perspective of the soft molded hand grip illustrating grooves for receiving the thumb and all fingers of the right hand of the operator.

FIG. 9 is a perspective of the rear of the hand grip of FIG. 8.

DESCRIPTION OF THE PREFERRED EMBODIMENT

The hand operated control 20 (FIG. 1) of the present invention is rigidly secured to a vehicle (not shown) in a position within easy reach of either the right hand or left hand of an operator, only a right hand control being illustrated in the drawings. Although the hand operated control may be used for other purposes, it is ideally suited for steering a ground or water supported vehicle; or for controlling the flight of an aircraft which may simultaneously include controlled movement of the aircraft about its longitudinal axis, its transverse axis, and an axis normal to these axes in order to climb or dive, roll and make controlled turns while in any attitude.

The hand operated control 20 comprises a tubular pedestal 22 that is rigidly secured to the vehicle (not shown), but represented by a control box 24 for receiving signals from an electro-mechanical-computer position sensing mechanism 25 and/or other movement sensing controls such as an electro-optical-computer position sensing mechanism. A two piece truncated sphere 26 has a lower piece 28 rigidly secured to the pedestal 22 and an upper piece 30 with a hole 31 therein. The upper piece is removably connected to the lower piece by screw threads as best shown in FIGS. 4–6. A relatively soft hand grip 32 made from a composite material such as urethane, of between 30–50 durometers, is molded to slidably move over the truncated sphere 26 when relaxed and to be clamped to the sphere 26 when firmly gripped.

As shown in FIGS. 1, 2, 8 and 9, the outer surface of the hand grip 32 is molded to provide grooves 34,36,38,40 and 42 for receiving the thumb and the four adjacent fingers, respectively, of the right hand of the operator. Also, thin protrusions 44,46 (FIG. 8) are provided to receive the ends of the index finger and next adjacent finger. If desired, electric switches may be placed within the hand grip 32 in alignment with the protrusions 44,46.

The position sensing mechanism 25 (FIGS. 4-7) is mounted within the control box 24, pedestal 22 and sphere 26 with a control portion 48 connected to the inner surface of the grip 32. The illustrated sensing mechanism is an electro-mechanical mechanism which transmits control signals to a computer (not shown) for operating the steering system of the vehicle. The sensing mechanism 25 is mounted within the pedestal 22 and truncated sphere as by bolting, and communicates with the control box 24. As illustrated in FIGS. 4–6, a motion sensing arm 52 has a rectangular upper end 54 which may be pivoted 360° about a vertical axis. The rectangular upper portion of the arm 52 is slidably received in a rectangular opening in a stem 56 that is rigidly secured to a spherical segment 58 which is bonded to the inner surface of a hand grip 32. It will be noted that the pivot point of the motion sensing lever or arm 52 (FIG. 5) is placed within the cupped hand of the operator, and that the operator makes control inputs by moving his hand around the upper portion of a small sphere sized so that the hand nearly encloses the sphere. This allows the operator to easily get a firm stabilizing grip on the sphere. It is important to note that since the pivot point of the motion sensing arm 52 is centered within the grip of the operator's hand, the radial control movement of the grip 32 is considerably different from the generally linear forces applied by the operator's hand to the grip due to a rough ride.

In operation of the hand operated control 20 (FIGS. 1 and 2) of the present invention, it will be assumed that the hand control is provided for controlling the attitude of a vehicle such as an aircraft, which requires coordinated movement of the hand grip 32 about three axes normal to each other.

When it is desired to climb along a linear path, the pilot or operator with his hand on the soft hand grip 32 (FIG. 1), relaxes his grip on the hand grip 32 and pivots the grip aft the desired amount to cause the aircraft to climb at a desired rate. In order to roll the aircraft about the longitudinal axis of the aircraft the operator would pivot his forearm and wrist (about the longitudinal axis of the forearm and wrist) to the right or left the desired amount to roll the aircraft to the right or left at the desired degree for the speed of roll desired. When making a left climbing turn, the operator would move his hand to a position similar to that shown in FIG. 2; and would pivot his wrist in the opposite direction to make a right climbing turn. It will be understood that in many of these maneuvers, the operator's hand may be moved diagonally or in several directions at the same time to maintain the aircraft in the desired attitude at all times. It will also be understood that the direction of movement of the motion sensing arm 52 (FIG. 5) resembles that of a joy stick in an aircraft provided with a conventional joy stick control system.

When the aircraft is flying in turbulent air, it will be understood that the pilot will relax his grip on the soft hand grip 32 when changing the attitude of the aircraft; and that he will firmly grip or squeeze the hand grip 32 in order to prevent unintentional motion of the hand grip and unintentional steering of the aircraft when a change of control is not required.

If the hand operated control 20 is to be used to steer a ground supported vehicle about an axis that is substantially normal to the vehicle supporting surface, then the hand grip 32 may be pivoted about the axis of the pedestal 22 to turn the vehicle to the left or right when the operator's grip is relaxed. When driving over rough ground, the operator firmly squeezes the soft hand grip 32 when not making steering changes in order to prevent the rough ride from causing unintended operator movement from inadvertently steering the vehicle.

Alternately, when steering a vehicle, the position sensing mechanism may be of the type which when pivoted to the right in a plane transverse to the vehicle's longitudinal axis causes the vehicle is turned to the right; and when pivoted to the left causes the vehicle to turned to the left.

Although the above description relates to using the hand operated control 20 as means for controlling the direction of movement of the vehicle, it will be understood that the control 20 may be used to actuate other components when a vehicle or other object that is to be controlled is subjected to severe vibration or the like.

Although an electro-mechanical position sensing mechanism has been illustrated herein, it will be understood that other types of sensing mechanisms may be used within the truncated sphere, hand grip and pedestal.

From the foregoing description it is apparent that the hand operated control of the present invention enables an operator of a rough riding vehicle to control the direction of the vehicle while preventing inadvertent operator movement due to the rough ride from being transmitted to the steering control system while at the same time allowing precise intentional control inputs to be made to the steering control system.

Although the best mode contemplated for carrying out the present invention has been herein shown and described, it will be apparent that modification and variation may be made without departing from what is regarded to be the subject matter of the invention.

What is claimed is:

1. A hand operated control for a vehicle having a computerized control therein comprising:
   means defining a truncated sphere connected to the vehicle;
   hand grip means having an inner surface normally movably received on said truncated sphere; and
   position sensing means partially disposed within said truncated sphere means and having a movable portion connected to said inner surface, said hand grip means when loosely gripped by the hand of an operator permitting movement of said hand grip means and resulting in control signals being sent to the computer, and when firmly gripped by the hand of the operator preventing control signal changes from being made.

2. An apparatus according to claim 1 wherein the vehicle is a rough riding vehicle, and wherein the truncated sphere is rigidly connected to the vehicle.

3. An apparatus according to claim 1 wherein said hand grip means is formed from a soft composite material.

4. An apparatus according to claim 3 wherein said hand grip means includes an external surface which is contoured for receiving fingers and thumb of the operator.

5. An apparatus according to claim 1 wherein said hand grip means encompasses a major portion of said truncated sphere.

6. An apparatus according to claim 4 wherein said hand grip means encompasses a major portion of said truncated sphere.

7. An apparatus according to claim 1 wherein said position sensing means comprises a lever having a pivot point within said truncated sphere, and a control portion connected to said lever and to said hand grip means.

8. An apparatus according to claim 7 wherein said position sensing means is an electro-mechanical means.

9. An apparatus according to claim 2 wherein the vehicle is an aircraft and wherein said hand operated control is effective in controlling the direction of movement of the aircraft; said hand grip means is pivoted to the right to roll to the right, is pivoted to the left to roll to the left, is pivoted rearwardly to climb, is pivoted forwardly to dive, and is simultaneously pivoted to the left and rearwardly when making a climbing left bank.

10. An apparatus according to claim 4 and additionally comprising an protrusion in said hand grip in position to be contacted by the tip of a finger, and switch means within said hand grip behind said protrusion being activated when depressed by the tip of said finger.

11. An apparatus according to claim 1 wherein control movement of the hand grip means occurs about a point centered within said hand grip means and the operator's hand thereon causing a radial control movement which sends said control signals to said computer.

12. A method of steering a vehicle with the aid of a soft hand grip movably received on a truncated sphere rigidly secured to the vehicle and having a position sensing means therein operatively connected to the hand grip and to a signal receiving computer which controls the direction of movement of the vehicle, comprising the steps of:

firmly gripping said soft hand grip to said truncated sphere for preventing relative movement between said hand grip and said sphere thereby preventing unintended steering of the vehicle due to a rough ride; and relaxing the grip on said soft hand grip and moving said grip relative to said truncated sphere thereby transmitting a steering signal to the computer for steering the vehicle.

13. A method according to claim 12 wherein momentary relaxation of an operator's hand on the hand grip and movement of the hand and grip relative to the truncated sphere permits steering signals to be sent to the computer.

14. A method according to claim 12 wherein the vehicle is an aircraft having a longitudinal axis and additionally comprising the steps of pivoting the hand grip rearwardly of the vehicle to climb, pivoting the hand grip forwardly of the vehicle to dive, pivoting the hand grip to the left of the longitudinal axis to roll to the left, pivoting the hand grip to the right of the longitudinal axis to roll to the right, and simultaneously pivoting the hand grip to the left and rearwardly when making a climbing left bank.

15. A method according to claim 12 wherein the vehicle is a ground supported vehicle adapted to be driven over rough terrain and having a longitudinal axis, and additionally comprising the steps of pivoting the soft hand grip about an upright axis to the right for turning the vehicle to the right and pivoting the soft hand grip about said upright axis to the left for turning the vehicle to the left.

* * * * *